(12) United States Patent
Knitel et al.

(10) Patent No.: US 8,039,036 B2
(45) Date of Patent: Oct. 18, 2011

(54) PREPARATION OF A BEVERAGE SUITABLE FOR CONSUMPTION

(75) Inventors: Joseph Theodoor Knitel, De Meern (NL); Vincent Jan Steenhof, 's-Hertogenbosch (NL)

(73) Assignee: Sara Lee/DE N.V., AA Utrecht (NL)

( * ) Notice: Subject to any disclaimer, the term of this patent is extended or adjusted under 35 U.S.C. 154(b) by 1207 days.

(21) Appl. No.: 10/569,909

(22) PCT Filed: Aug. 23, 2004

(86) PCT No.: PCT/NL2004/000590
§ 371 (c)(1),
(2), (4) Date: Oct. 24, 2006

(87) PCT Pub. No.: WO2005/018394
PCT Pub. Date: Mar. 3, 2005

(65) Prior Publication Data
US 2007/0071869 A1 Mar. 29, 2007

(30) Foreign Application Priority Data
Aug. 25, 2003 (NL) ..................................... 1024160

(51) Int. Cl.
*A23F 5/00* (2006.01)
(52) U.S. Cl. .......... 426/595; 426/433; 426/435; 426/79
(58) Field of Classification Search .................. 426/595, 426/433, 435, 79
See application file for complete search history.

(56) References Cited

U.S. PATENT DOCUMENTS

| 3,450,024 A | 6/1969 | Martin |
| 3,830,940 A * | 8/1974 | Sivetz ........................... 426/594 |

(Continued)

FOREIGN PATENT DOCUMENTS

EP 0 756 844 2/1997
(Continued)

OTHER PUBLICATIONS

Communication of a notice of opposition and request to file observations for Application No. 04774897.5—1258, Patent No. 1662952, dated Nov. 29, 2010, 1 page.

(Continued)

*Primary Examiner* — Anthony Weier
(74) *Attorney, Agent, or Firm* — Foley & Lardner LLP (57) ABSTRACT

A method for the preparation of a beverage suitable for consumption such as, for instance, cappuccino, wherein use is made of at least one extraction pad (44) at least filled with a product to be extracted such as ground coffee (45), and at least one additive holder (32) at least filled with a soluble substance such as a flavoring and/or odorant and/or colorant, more in particular such as an instant and/or liquid creamer (35), the method further having the following method steps: the extraction pad (44) and the additive holder (32) are positioned relative to each other such that they lie clear of each other; hot water is pressed under pressure through the extraction pad (44) and contacted with the soluble substance (35) for obtaining an extract with the soluble substance (35) dissolved therein;—the extract with the soluble substance (35) dissolved therein is fed under pressure to at least one nozzle (28) for obtaining an extract jet; and the extract jet is aimed at an impact surface (16) for obtaining a beverage suitable for consumption with a froth layer, such as cappuccino.

31 Claims, 4 Drawing Sheets

U.S. PATENT DOCUMENTS

| | | | |
|---|---|---|---|
| 3,892,867 A * | 7/1975 | Schoonman | 426/93 |
| 4,739,697 A | 4/1988 | Roberts | |
| 4,843,955 A | 7/1989 | Henn et al. | |
| 5,108,768 A * | 4/1992 | So | 426/77 |
| 5,150,645 A | 9/1992 | Schiettecatte | |
| 5,567,461 A * | 10/1996 | Lehrer | 426/417 |
| 5,895,672 A * | 4/1999 | Cooper | 426/79 |
| 6,158,328 A * | 12/2000 | Cai | 99/293 |
| 6,485,766 B2 * | 11/2002 | Herod | 426/78 |
| 6,777,007 B2 * | 8/2004 | Cai | 426/78 |
| 7,594,470 B2 * | 9/2009 | Scarchilli et al. | 99/295 |
| 2005/0034607 A1 * | 2/2005 | Stevenson | 99/321 |

FOREIGN PATENT DOCUMENTS

| | | |
|---|---|---|
| EP | 0 878 158 | 11/1998 |
| EP | 1 092 377 | 4/2001 |
| EP | 0 904 717 B1 | 7/2001 |
| EP | 1 371 311 A1 | 12/2003 |
| EP | 1398279 | 3/2004 |
| EP | 1 317 200 B1 | 4/2005 |
| WO | WO 95/26141 | 10/1995 |
| WO | WO 02/19877 | 3/2002 |
| WO | WO 03/026470 | 4/2003 |
| WO | WO 03/105641 | 12/2003 |

OTHER PUBLICATIONS

Communication of further notices of opposition pursuant to Rule 79(2) EPC for Application No. 04774897.5—1258, Patent No. 1662952, dated Nov. 29, 2010, 1 page.

Communication of a notice of opposition for Application No. 04774897.5—1258, Patent No. 1662952, dated Oct. 27, 2010, 1 page.

Notice of opposition to a European patent for Application No. 04774897.5—1258, Patent No. EP 1662952, dated Oct. 20, 2010, 5 pages.

Filing of a new opposition for Application No. 04774897.5—1258, Patent No. EP 1662952, dated Oct. 20, 2010, 11 pages.

* cited by examiner

PREPARATION OF A BEVERAGE SUITABLE FOR CONSUMPTION

The invention relates to a method for preparing a beverage suitable for consumption such as cappuccino. Further, the invention relates to an assembly for use in an apparatus for the preparation of the beverage. In addition, the invention relates to a collecting container and an additive holder of the assembly. The invention also relates to an apparatus for the preparation of the beverage.

Such a method is known from EP 075 68 44. In the known methods, an extraction pad in the form of a coffee pad filled with ground coffee and an additive holder in the form of a creamer pad filled with a creamer are inserted into a holder of a conventional espresso machine while the coffee pad rests on the creamer pad. Thereupon, in a customary manner, the preparation cycle is carried out in which the coffee pad and the creamer pad are contacted with hot water and/or steam. With the known method, it is of importance that the holder has a void volume for obtaining froth with the cappuccino.

A drawback of the known method is that the amount of creamer that dissolves and the amount of froth and the nature of the froth formed (big and/or fine bubbles) is relatively poorly reproducible. The object of the invention is to provide a method with which this disadvantage can be met.

According to the invention, it holds that with the method for the preparation of a beverage suitable for consumption such as, for instance, cappuccino, use is made of at least one extraction pad at least filled with a product to be extracted such as ground coffee, and at least one additive holder at least filled with a soluble substance such as a flavouring and/or an odorant and/or a colorant, more in particular such as an instant and/or liquid creamer, the method further comprising the following method steps:

the extraction pad and the additive holder are positioned relative to each other such that they lie clear of each other;

hot water is pressed under pressure through the extraction pad and is contacted with the soluble substance for obtaining an extract with the soluble substance dissolved therein;

the extract with the soluble substance dissolved therein is fed under pressure to at least one nozzle for obtaining an extract jet; and the extract jet is aimed at an impact surface for obtaining the beverage suitable for consumption with a froth layer, such as a cappuccino.

According to the method of the invention, the extraction pad does not rest on the additive holder because they are separated from each other by a mutual, intermediate space. As a result, during the preparation cycle, the position and the shape of the extraction pad in the collecting container are independent of the shape of the additive holder. This entails that the through-flow of the extraction pad is at least virtually independent of the degree of filling of the additive holder, also when it is designed as an additive holder, not form-retaining and manufactured from, for instance, filtering paper. The fact is that during a preparation cycle, the soluble substance will gradually dissolve so that the degree of filling is decreased and hence the shape of the not form-retaining additive holder changes. This latter has no influence on the position and the shape of the extraction pad. Also, the extraction pad cannot influence the shape and the position of the additive holder by direct contact between extraction pad and the additive holder when the additive holder is designed not to be form-retaining. Hence, the amount of soluble substance dissolving during a preparation cycle cannot be influenced by an unpredictable contact between extraction pad and the additive holder. The method can then be carried out repeatedly having, each consecutive time, a virtually similar result with respect to the beverage.

As, further, use is made of a nozzle to which the extract in which the soluble substance has dissolved is fed, a fine bubble froth layer is obtained. In case the product to be extracted comprises ground coffee and the soluble substance is a creamer, this has the character of a real cappuccino.

In particular it holds that the invention comprises a method wherein:

hot water is pressed under pressure through the extraction pad for obtaining an extract; and the extract is contacted in the additive holder with the soluble substance for obtaining an extract having the dissolved soluble substance therein.

In particular, it further holds that the extraction pad and the additive holder are separated from each other by a separating body provided with at least one passage, while the extract is fed from the extraction pad via the at least one passage to the additive holder. By utilizing the separating body with the at least one passage, the extract can be fed to the additive holder in a predetermined manner.

In particular, it further holds that the separating body is provided with a separating plate comprising a plurality of passages so that the extract is fed to the additive holder at various positions of the additive holder. This has as an advantage that the amount of soluble substance dissolving in the additive holder during a preparation cycle can be maximized.

According to a preferred embodiment, it holds that the extraction pad and the additive holder together are inserted into a collecting container, the additive holder being placed downstream of the extraction pad, the extraction pad and the additive holder being positioned relative to each other with the aid of positioning means such that the extraction pad and the additive holder lie clear of each other.

Preferably, it then holds that for the provision of the positioning means, use is made of an extraction pad holder provided with a bottom on which the extraction pad rests while in the bottom at least one through-flow opening is provided for feeding the extract via the through-flow opening to the additive holder.

According to a highly advanced embodiment of the method, it further holds that the extraction pad and the additive holder are separated from each other by a separating body provided with at least one passage while the extract is fed from the extraction pad via the at least one passage to the additive holder.

Here, it preferably holds that the separating body is provided with a separating plate comprising a plurality of passages so that the extract can be fed, via the passages, to the additive holder at various positions of the additive holder. This special embodiment of the method too has as an advantage that in a predetermined manner, extract can be fed to the holder thus that, if so desired, the soluble substance dissolves as much as possible during a preparation cycle.

The assembly for use in an apparatus such as a coffee machine for the preparation of a beverage suitable for consumption such as cappuccino is provided with a collecting container comprising at least one inflow opening, at least one outflow opening and a liquid flow path extending from the inflow opening to the outflow opening, the assembly being further provided with at least one extraction pad at least filled with a product to be extracted such as ground coffee and at least one additive holder at least filled with a soluble substance such as a soluble flavouring and/or odorant and/or colorant, more in particular such as an instant and/or liquid creamer, the collecting container being further provided with a first space included in the liquid flow path for including the extraction pad in the liquid flow path, a second space included in the liquid flow path for including the additive holder in the liquid flow path and positioning means for positioning, during use, the extraction pad and the additive holder relative to each other such that the extraction pad and the additive holder lie clear of each other, the extraction pad being preferably located upstream of the additive holder in the liquid flow path.

In use, the hot water will first be pressed through the extraction pad thereby forming the extract. Then the extract is contacted with the soluble substance, for instance by feeding the extract through the additive holder, the soluble substance then dissolving in the extract. Hereafter, the extract with the soluble substance dissolved therein will leave the collecting container via the outflow opening. Such an assembly can preferably be utilized in the method as described hereinabove.

In particular, it holds that the positioning means comprise an extraction pad holder having a bottom on which the extraction pad rests, while in the bottom at least one through-flow opening is provided for feeding extract, via the through-flow opening, to the additive holder. Owing to the use of the extraction pad holder, it again holds that during a preparation cycle, the shape of the extraction pad and the optional not form-retaining additive holder will not be influenced through contact between the extraction pad and the additive holder. As a result, the degree of filling of the additive holder will also have no influence on the shape and the position of the extraction pad and vice versa.

In particular, it holds that in the bottom, a plurality of through-flow openings are provided.

Further, it holds in particular that the assembly is further provided with a separating body provided with at least one passage, the separating body being included between the extraction pad and the additive holder, while during use, the extract is fed from the extraction pad, via the at least one passage, to the additive holder. Through the use of the separating body, the extract can be fed to the additive holder in a predetermined manner. If so desired, this manner can be optimized in order that the flavouring and/or the odorant and/or the colorant dissolve as much as possible in the additive holder during a preparation cycle.

In particular, it holds that the separating body is provided with a separating plate comprising a plurality of passages so that, in use, the extract is fed via the passages to the additive holder at various positions of the additive holder.

The collecting container according to the invention for use in an apparatus such as a coffee machine for the preparation of a beverage suitable for consumption such as cappuccino, is characterized in that the collecting container is designed for including at least one extraction pad at least filled with a product to be extracted such as ground coffee, and at least one additive holder at least filled with a soluble substance such as a soluble flavouring and/or odorant and/or colorant, more in particular such as an instant and/or liquid creamer, the collecting container being provided with at least one inflow opening, at least one outflow opening and a liquid flow path extending from the inflow opening to the outflow opening, the collecting container being further provided with a first space included in the liquid flow path for including the extraction pad in the liquid flow path, a second space included in the liquid flow path for including the additive holder in the liquid flow path and positioning means for positioning, during use, the extraction pad and the additive holder relative to each other such that the extraction pad and the additive holder lie clear of each other, while the extraction pad is located in the liquid flow path downstream of the additive holder.

The apparatus for the preparation of a beverage suitable for consumption such as cappuccino, is provided with a collecting container, as described hereinabove, and means for feeding hot water under pressure to the inflow opening of the collecting container.

The method as described hereinabove can be carried out with the aid of an apparatus as described in Dutch patent application 1013270, while the container of this apparatus is replaced by the collecting container according to the present invention. The method can also be carried out with the aid of an apparatus as described in European patent application 904717 or 878158, while the holder filled with the pouch with ground coffee is replaced by the assembly or the collecting container of the present invention.

The invention will presently be further elucidated with reference to the drawing. In the drawing:

FIG. 1b shows a perspective view of a container receiving unit of the apparatus of FIG. 1a;

FIG. 1d shows a cross section of the container receiving unit according to the line 1d of FIG. 1a;

FIG. 2a shows a collecting container which, in use, is placed in the chamber of the container receiving unit according to FIG. 1a;

FIG. 2b shows a cross section of the holder according to line 2b of FIG. 2a;

FIG. 2d shows a cross section according to FIG. 2a, the container being filled with the extraction pad and an additive holder;

FIG. 3a is the element of the collecting container according to FIG. 2b;

FIG. 3b is a cross section according to FIG. 3a; and

FIG. 4 is a possible embodiment of a separating body which is used herein the collecting container of FIGS. 1 and 2.

Figure 1A:
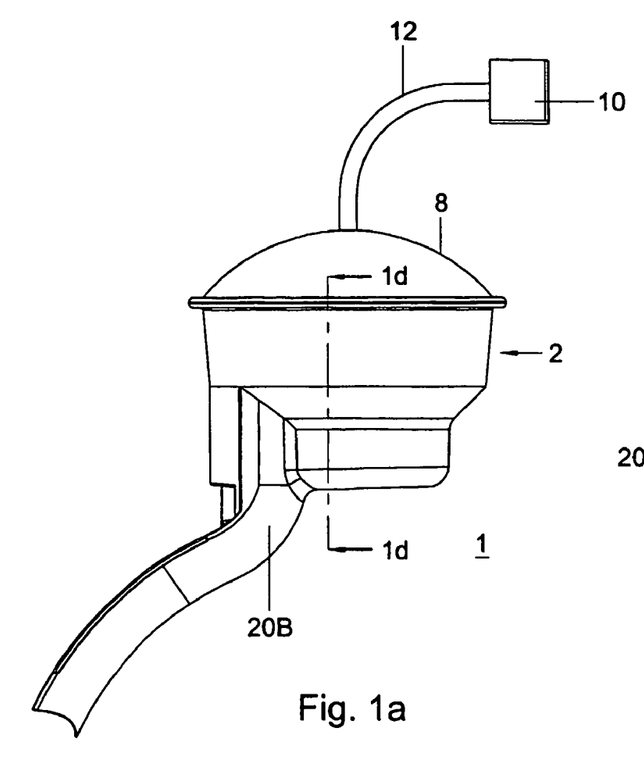
FIG. 1a shows a side view of a possible embodiment of an apparatus according to the invention for the preparation of cappuccino.
Figure 1B:
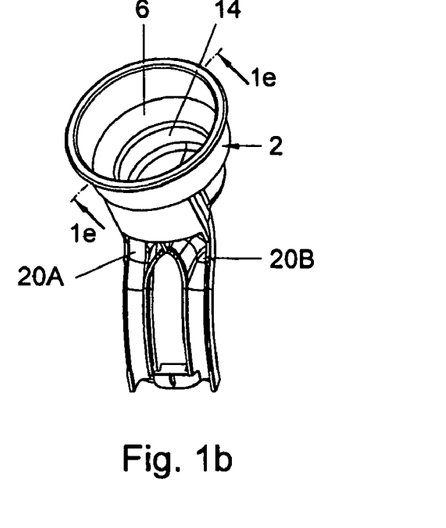
Figure 1C:
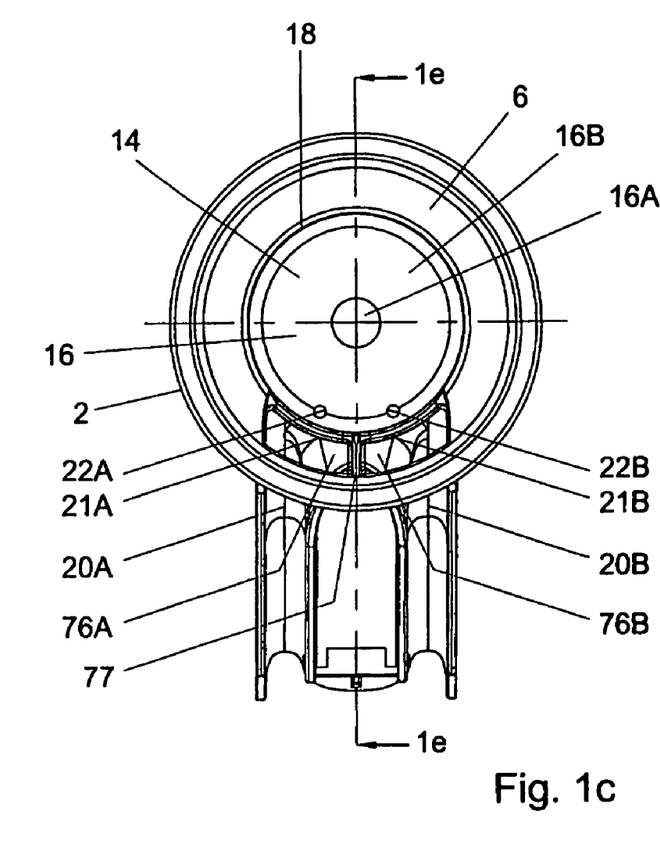
FIG. 1c shows a top plan view of the container receiving unit according to FIG. 1b; the collecting container of FIG. 2a being included in the container receiving unit.
Figure 1D:
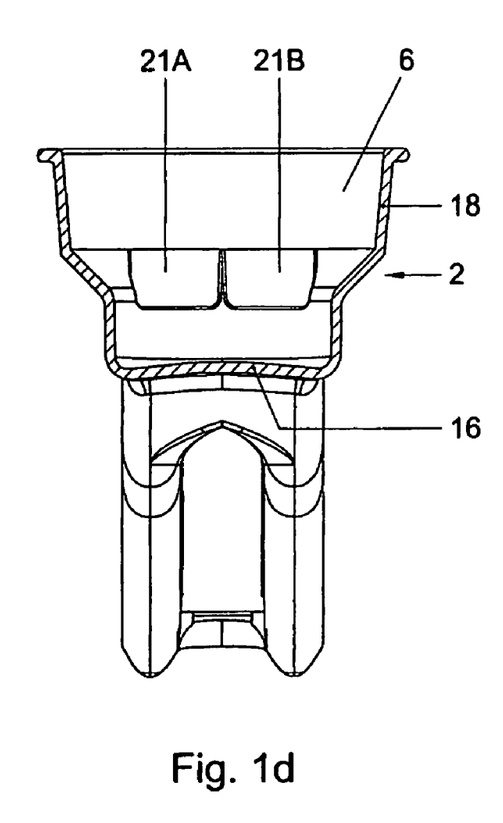
Figure 1E:
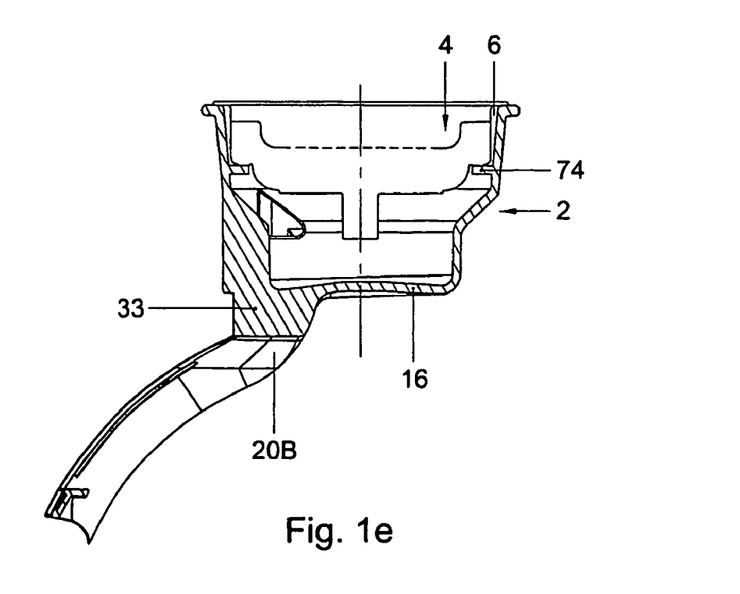
FIG. 1e shows a cross section of the container receiving unit according to the line 1e of FIG. 1c.
Figure 2A:
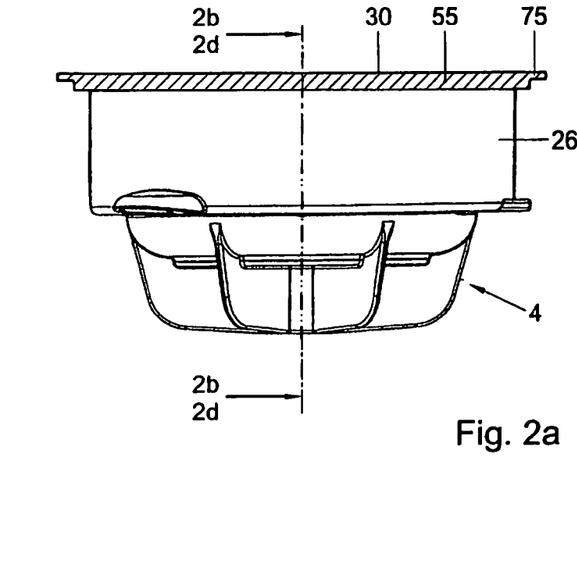

In FIG. 1a, with reference numeral 1, an apparatus for the preparation of a cappuccino with a fine bubble froth layer of milk is shown. The apparatus is provided with a container receiving unit 2 in which a removable collecting container 4, as shown in FIG. 2a, is received. In FIG. 1b, in perspective view, the container receiving unit 2 is shown without a collecting container. As appears from FIG. 1b, the container receiving unit 2 is provided with a receiving space 6 in which, during use, the collecting container 4 can be received. In FIG. 1a and 1c, the container receiving unit 2 is shown with the collecting container 4 included therein.

The apparatus is further provided with a removable lid 8 with which the collecting container can be closed off when it has been placed in the receiving space 6. The apparatus further comprises a hot water unit 10 designed for feeding hot water via a hose 12 to the collecting container 4 which is closed of by the lid 8.

The container receiving unit 2 is further provided with a buffer reservoir 14 having, in top plan view, a substantially convex bottom 16 and upright side walls 18. Near to the centre of the bottom however, the bottom has a substantially flat shape. The flat part of the bottom is indicated in FIG. 1c with reference numeral 16A, while the convex part is indicated with reference numeral 16B. In this example, at the bottom of the container receiving unit 2, at a level below the bottom 16 of the buffer reservoir 14, two outlets 20A and 20B are present for dispensing the cappuccino with the fine bubble froth layer (see FIG. 1c). In an upright sidewall of the buffer reservoir, two overflows 21A and 21B are present which are in fluid communication with the outlets 20A and 20B, respectively. Further, in the bottom 16 of the buffer reservoir 14 two further openings 22A and 22B are provided, which are also in fluid communication with the outlets 20A and 20B. These openings 22A and 22B are located at a low, and in this example the lowest level of, viewed from above, the convex bottom 16. The collecting container 4 and the buffer reservoir 14 are therefore successively included in a liquid flow path extending from the hot water unit 10 to the outlets 20A, 20B, respectively.

Figure 2B:
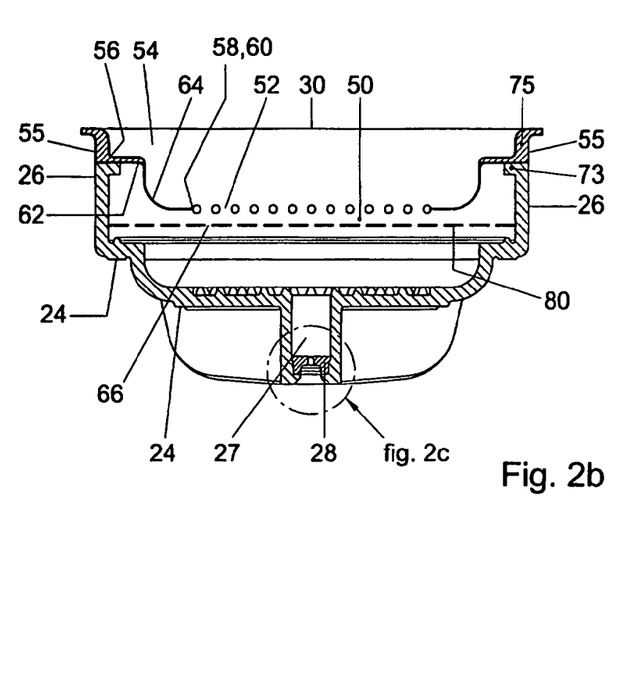

The collecting container 4 is provided with a bottom 24 and an upright sidewall 26. The bottom 24 is provided with an outflow opening 27 in which a nozzle 28 is included. The nozzle 28 is manufactured from a rigid material. A hard plastic or a metal can be considered here. Herein, nozzle is understood to mean any element or means with which a jet can be generated. At its upper side, the collecting container 4 is provided with an inflow opening 30.

Figure 2C:
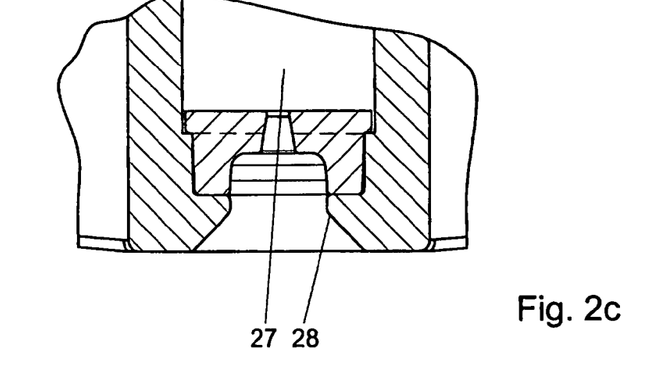
FIG. 2c shows a detail of an encircled part of FIG. 2b.
Figures 2D, 3A, 3B, 4:
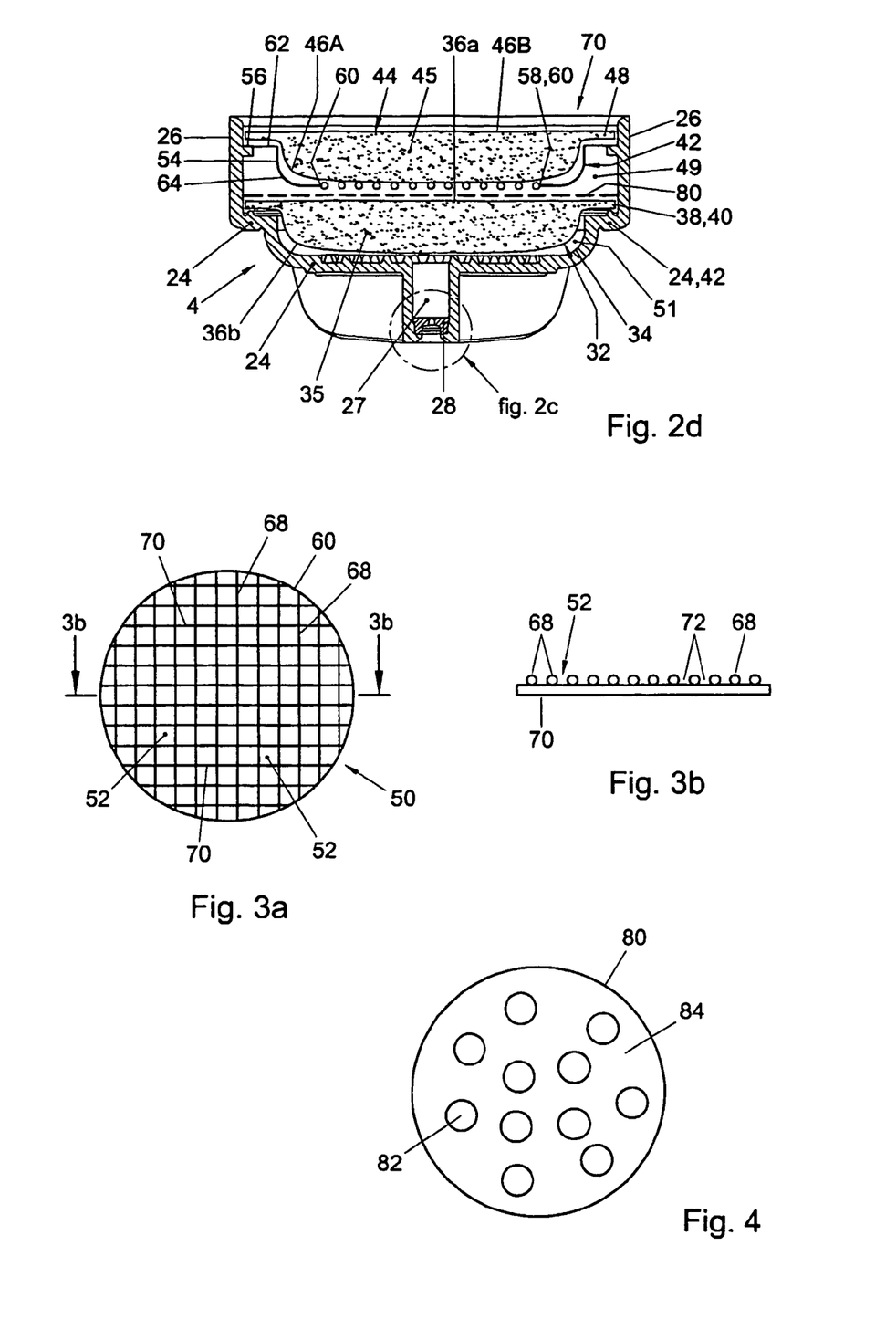

On the bottom 24, an additive holder 32 rests, filled with a soluble substance known per se such as a soluble flavouring and/or odorant and/or colorant, in this example an instant and/or liquid creamer. In this example, the additive holder 32 comprises a creamer package 34 filled with the creamer 35. This may be a dairy creamer or a non-dairy creamer. In this example, the creamer package 34 is manufactured from filtering paper. The additive holder is therefore designed as an additive pad. Hereinafter, the additive pad will also be indicated as creamer pad. In this example, the creamer package 34 comprises an upper sheet 36A and an lower sheet 36B each manufactured from filtering paper and sealed together along their circumferential edges 38. The thus sealed together parts form a circumferential sealing joint 40. In this example, the lower side of the creamer package 34, i.e. the lower sheet 36B, is dish-shaped while the upper side, i.e. the upper sheet 36A, is of flat design.

The collecting container 4 is further provided with positioning means 42, positioning the extraction pad 44 filled with a product to be extracted and the creamer pad 32 relative to each other such that the extraction pad 44 is located at a distance from the creamer pad 32. Therefore, the extraction pad and the creamer pad lie clear of each other. Inside the collecting container 4, a liquid flow path extends from the inflow opening 30 to the outflow opening 27. The extraction pad 44 and the creamer pad 32 are included in this liquid flow path. In this example, the extraction pad is located upstream relative to the creamer pad in the liquid flow path, in a first space 45 of the collecting container. In this example, the creamer pad 32 is located downstream of the extraction pad in this liquid flow path in a second space 51 of the collecting container (see FIG. 2d). The extraction pad 44 is filled with ground coffee 45 and will therefore also be indicated hereinbelow as coffee pad. The coffee pad 44 is provided with a lower sheet 46A manufactured from filtering paper and an upper sheet 46B manufactured from filtering paper which are joined together adjacent circumferential edges 48. The joined parts form a circumferential sealing joint. The lower sheet 46A is of cup-shaped design and the upper sheet 46B is of flat design.

In this example, the positioning means 42 comprise the bottom 24 on which the additive holder or creamer pad rests. The positioning means 42 are further provided with a plate-shaped element 50 located at a distance from the bottom 24. The element 50 extends at least virtually parallel to the bottom 24. In the element, a plurality of through-flow openings 52 are provided. The positioning means 42 are further provided with a supporting surface 54 extending around the element 50 and an upright sidewall 55. An outer edge 56 of the supporting surface 54 reaches as far as the upright sidewall 55 and an inner edge 58 of the supporting surface 54 reaches as far as an outer edge 60 of the element 50. The supporting surface 54 comprises a ring-shaped outer part 62 which, together with the upright sidewall 55, adjoins the upright sidewall 26, and an inner part 64 reaching downwardly away from the upright sidewall 26, which part adjoins the element 50. Together with the inner part 64, the element 50 forms a cup-shaped space wherein the described convex lower side of the coffee pad fits. The circumferential sealing joint of the coffee pad lies flat on the outer part 62. The element 50, the outer part 62 and the inner part 64, and the upright sidewall 55 together form an extraction pad holder, indicated hereinafter as coffee pad holder 66 for receiving the coffee pad 44, the bottom of the coffee pad holder 66 being formed by the outer part 62, the inner part 64 and the element 50. In this bottom, by means of the element 50, a plurality of through-flow openings 52 is provided.

In this example, by means of the coffee pad holder 66, the positioning means 42 support the coffee pad such that the coffee pad is located at a distance from the creamer pad 32, the creamer pad being included between the bottom 24 and the coffee pad 44. Hence, the coffee pad 44 and the creamer pad 32 are positioned relative to each other such that they lie clear of each other. In this example, the element 50 is composed from a first number of parallel, spaced apart, separate metal wires 68 and a second number of parallel, spaced apart, separate metal wires 70 which are in one plane. The wires 68 are directed perpendicularly to the wires 70, the first number of wires 68 being connected to the second number of wires 70 by means of, for instance, soldering. All this entails that the through-flow openings 52 are enclosed by, each time, two of the wires 68 and two of the wires 70. Further, on a side proximal to the coffee pad, the element is provided with grooves 72. The grooves are formed by intermediate spaces between neighbouring wires 68. In particular, completely analogously, the element is provided with grooves on the side facing away from the coffee pad (not shown). These grooves are formed by intermediate spaces between the wires 70. In this example, the coffee pad holder 66 lies in a detachable manner on the rest of the collecting container 4. The coffee pad holder 66 rests on projections 73 of the upright sidewall 26.

The operation of the apparatus described to this point is as follows. The coffee pad holder 66 is removed (lifted from the upright sidewall 26 and the projections 73) from the rest of the collecting container 4. Hereafter, the creamer pad 32 is placed in the second space 51 on the bottom 24 of the container 4. Then, the coffee pad holder 66 is placed back in the first space 49. The coffee pad 44 is placed on top of the coffee pad holder 66. Thus, the collecting container 4, coffee pad 44 and creamer pad 32 form the assembly, a cross section of which is shown in FIG. 2d. Thereupon, the collecting container 4 is placed in the container receiving unit 4 which is closed off by the lid 8. The collecting container 4 then rests on the projections 74 of the container receiving unit 2. Here, the lid closes off in a fluid tight manner on a top side 75 of the upright sidewall 55 of the coffee pad holder 66. Then, the hot water unit 10 is started whereupon via hose 12 hot water is fed to the inflow opening 30 of the collecting container 4 formed, in this example, by the coffee pad holder 66. The hot water is pressed under pressure through the coffee pad 44 for obtaining the coffee extract. The thus formed coffee extract flows through the element 50 to the creamer pad 32 for obtaining a coffee extract with creamer dissolved therein. The coffee extract flows, at least partly, via the upper sheet 36A and the lower sheet 36B through the creamer while the creamer dissolves. The coffee extract with the creamer dissolved therein then leaves the collecting container 4 under pressure via the outflow opening 27. The coffee extract with the creamer dissolved therein is then fed under pressure to the nozzle 28 for obtaining a coffee extract jet. This coffee extract jet is aimed at an impact surface formed by the bottom 24 of the buffer reservoir 14. Upon impact with the impact surface, froth and, hence, cappuccino is formed. Thereupon, the buffer reservoir will gradually fill with the coffee extract whereupon the coffee extract jet obtained with the aid of the nozzle spouts into the liquid surface of the coffee extract already stored in the buffer reservoir. Here too, air is beaten into the coffee extract so that froth is formed. Thus, the buffer reservoir is filled with coffee extract with a fine bubble froth layer. When the buffer reservoir has sufficiently filled, it will start emptying via the overflows 21A and 21B provided in the sidewall of the buffer reservoir, a lower point of the overflows being located above the highest level of the bottom 16 of the buffer reservoir. The minimum level of the coffee extract in the buffer reservoir at which the buffer reservoir starts to empty via the overflows 21A and 21B is therefore determined by the level of the lowest point of the overflows 21A and 21B. The coffee extract in the form of cappuccino thus flowing from the buffer reservoir will flow to a position at the bottom of the receiving unit 2. This position lies below the bottom 16 of the buffer reservoir. As already mentioned, at the bottom of the container receiving unit 2, outlets 20A and 20B are included via which the cappuccino with the fine bubble froth layer will leave the container receiving unit 2 to be collected in, for instance, one or two cups, respectively. If the desired amount of water has been added to the coffee pad 44, the hot water unit 10 is switched off. The remaining amount of coffee extract still present in the buffer reservoir 14 then flows away from the buffer reservoir via the overflows 21A and 21B and finally the rest via the openings 22A and 22B.

In particular, a space 76 below the buffer reservoir is divided into two equal parts 76A and 76B by means of an upright partition 76. The space 76A is then in fluid communication with the overflow 21A, the opening 22A and the outlet 20A, and the space 76B is in fluid communication with the overflow 21B, the opening 22B and the outlet 20B. The coffee extract flowing via the overflow 21A or the opening 22A to the space 76A will leave the container receiving unit via the outlet 20A. The coffee extract flowing via the overflow 21B or the opening 22B to the space 76B will leave the container receiving unit via the outlet 20B. Per outlet 20A and 20B at least virtually the same amount of cappuccino is dispensed.

Hence, it holds that the coffee pad 44 and the creamer pad 32 are included in the collecting container 4 together, while the creamer pad 32 is placed downstream of the coffee pad 44, while the coffee pad 44 is supported by positioning means 42 so that the coffee pad 44 and the creamer pad lie clear of each other. As coffee pad 44 and the creamer pad, not form retaining in this example, lie clear from each other, it appears that each time a cappuccino can be formed having the same quality. The fact is that also when the creamer dissolves so that the size of the creamer pad decreases and its shape changes, this has no influence on the positioning and, hence, the extraction of the coffee pad. Conversely, the coffee pad itself has no predictable influence on the manner in which the creamer pad is flowed through and hence, the dissolution of the creamer. Thus, each time, a cappuccino of the same quality will be obtained.

To ensure that the coffee extract which is pressed through the coffee pad can easily finds its way to the creamer holder, the element 50 is provided with earlier mentioned grooves 72. The grooves 72 which are located on the upper side of the element 50 furthermore ensure that the lower side of the coffee pad 44, at least the part thereof which extends over the element 50, remains open and can be flowed through easily by the coffee extract formed.

According to a special embodiment of the collecting container 4, the collecting container 4 is further provided with a separating body 80 (see FIG. 2b and FIG. 4) provided with at least one passage 82 and, in this example, a plurality of passages 82 while the separating body 80 is included between the coffee pad 44 and the creamer pad 32. Therefore, in use, the coffee extract will be fed from the coffee pad via the passage 82 to the creamer holder. Here, it holds for that matter, that the separating body 80 is provided between the coffee pad holder and the creamer 32. As, in this example, the separating body is provided with a plurality of passages 82, it is ensured that in use, via the passages 82, the coffee extract is fed to the creamer pad at various positions of the creamer pad. What is achieved in this manner is that the creamer pad is flowed through at various positions so that a relatively large part of the creamer will dissolve. In this example; the separating body is provided with a separating plate 84 such as a shower head plate, in which a plurality of passages 82 are provided. The number of openings, the position of the openings and the (hydraulic) diameter of the openings can vary.

The invention is not limited in any manner to the embodiments outlined hereinabove. For instance, the additive holder can also be provided with a form retaining cup filled with a soluble substance, such as a soluble flavouring and/or odorant and/or colorant, as the above-mentioned creamer. This cup can have a shape as described hereinabove with reference to the creamer pad and can be manufactured, at least partly, from a material which bursts open when hot water is supplied so that tears are formed, or which dissolves. The cup can be manufactured, for instance, as described in Dutch patent application 1006874. The additive holder or creamer pad can further consist of a (for instance rigid) holder open at the top which is designed so as to be refillable. This holder can have the shape of the lower sheet 36B.

In this example, the creamer pad lies clear of the element 50. However, it is conceivable that a very limited distance, or no distance is present between the element 50 and the upper side 36A of the creamer pad.

It is also conceivable that the extraction pad and the creamer pad are switched in the collecting container. In that case, the creamer pad rests on the extraction pad holder 66, indicated hereinabove as coffee pad holder 66, and the extraction pad 66 rests on the bottom 24 of the collecting container 4. This bottom 24 can then be designed as described in European patent 904717. In that case, the hot water is first contacted in the creamer pad with the soluble substance for obtaining water with the dissolved soluble substance therein. Then, the extract with the soluble substance dissolved therein is fed under pressure to the at least one nozzle for obtaining an extract jet; and the extract jet is aimed at an impact surface for obtaining the beverage with a froth layer suitable for consumption, such as cappuccino. Here too, the extraction pad and creamer pad are positioned relative to each other such that they lie clear of each other. In this example, the positioning as such is carried out with the positioning means described hereinabove.

Further, the buffer reservoir can be replaced by a single impact surface (as described in the European patent application 1317200) optionally roughened. When the coffee extract jet with the creamer dissolved therein impacts on the impact surface, froth is formed as well. The cappuccino can then flow away along, for instance, the impact surface when this has been disposed at an inclination, towards a cup. Naturally, this also means that the impact surface, as indicated in European patent 1317200, can be formed by a gauze through which the extract flows for obtaining froth. Also, the buffer reservoir can be replaced by apparatus described in Dutch patent application 1020833.

In this example, the extraction pad is filled with ground coffee. Other products such as tea and combinations thereof are also possible. In addition, further soluble substances such as flavourings, odorants or colorants can be added.

In this example, the additive holder is filled with a creamer. However, different flavourings, odorants or colorants such as sugar and combinations thereof are also possible. Herein, soluble substance is understood to mean a flavouring, odorant or colorant and also a soluble binder which increases the viscosity of the extract after some time, for instance after the extract has passed the nozzle.

The invention claimed is:

1. A method for the preparation of a beverage suitable for consumption using at least one extraction pad filled with a product to be extracted, and at least one additive holder filled with a soluble substance, the method comprising:
    positioning the extraction pad and the additive holder relative to each other within first and second spaces, respectively, of a collecting chamber using positioning means so that the extraction pad and the additive holder are separated by an intermediate space;
    pressing hot water under pressure through the extraction pad and the soluble substance in the at least one additive holder for obtaining an extract with the soluble substance dissolved therein;
    feeding the extract with the soluble substance dissolved therein under pressure to at least one nozzle for obtaining an extract jet; and
    aiming the extract jet at an impact surface for obtaining a beverage suitable for consumption with a froth layer;
    wherein the positioning means includes a bottom on which the extraction pad rests, the bottom having at least one through-flow opening for feeding extract to the additive holder; and
    wherein the collecting container is removeably positioned in a receiving space of a container receiving unit, and the container receiving unit includes the impact surface;
    wherein the extraction pad and the additive holder are deformable and the intermediate space is configured such that deformation of one of the extraction pad and the additive holder does not cause a deformation of the other of the extraction pad and the additive holder.

2. A method according to claim 1, wherein:
    hot water is pressed under pressure through the extraction pad for obtaining the extract; and
    the extract is contacted in the additive holder with the soluble substance for obtaining the extract with the soluble substance dissolved therein.

3. A method according to claim 2, wherein the extraction pad and the additive holder are separated from each other by a separating body provided with at least one passage, while the extract is fed from the extraction pad via the at least one passage to the additive holder.

4. A method according to claim 3, wherein the separating body is provided with a separating plate comprising a plurality of passages so that the extract is fed to the additive holder at various positions of the additive holder, while at various positions of the additive holder, the additive holder is accessible to the extract.

5. A method according to claim 2, wherein the collecting container is provided with at least one inflow opening and at least one outflow opening, while the extraction pad and the additive holder are included in a liquid flow path extending in the collecting container from the inflow opening to the outflow opening, while the hot water is fed under pressure to the inflow opening, the extract with the soluble substance dissolved therein being discharged from the collecting container via the outflow opening.

6. A method according to claim 5, wherein the at least one outflow opening is in fluid communication with the at least one nozzle.

7. A method according claim 5, wherein the extraction pad and the additive holder are separated from each other by a separating body provided with at least one passage, while the extract is fed from the extraction pad via the at least one passage to the additive holder.

8. A method according to claim 7, wherein the separating body is provided with a separating plate comprising a plurality of passages so that the extract is fed to the additive holder via the plurality of passages.

9. A method according to claim 8, wherein the separating plate is included between the extraction pad holder and the additive holder.

10. A method according to claim 1, wherein the additive holder is provided with an additive pad filled with the soluble substance.

11. A method according to claim 7, wherein the additive pad is provided with a covering manufactured, at least partly, from filtering paper.

12. A method according to claim 1, wherein the additive holder is provided with a cup filled with the soluble substance.

13. A method according to claim 12, wherein the cup is manufactured from a material which bursts open, at least partly, when the extract is supplied.

14. A method according to claim 1, wherein the extraction pad is provided with a covering which is manufactured, at least partly, from filtering paper.

15. A method according to claim 1, wherein the impact surface forms part of a bottom of a buffer reservoir, the buffer reservoir being filled by the extract jet with the soluble substance dissolved therein, which extract jet impacts on a liquid surface formed earlier from the extract jet in the buffer reservoir.

16. A method according to claim 15, wherein the beverage is discharged from the buffer reservoir for consumption.

17. A method according to claim 1, wherein the impact surface is of roughened design.

18. An apparatus for preparing a beverage suitable for consumption, the apparatus comprising:
    a container receiving unit having a receiving space and an impact surface;
    an assembly configured to be removeably received within the receiving space and comprising:
        a deformable extraction pad having a product to be extracted provided therein,
        a deformable additive holder having a soluble substance provided therein; and a collecting container, the collecting container comprising:
- an inflow opening;
- an outflow opening fluidly connected to the inflow opening via a liquid flow path;
- a first space provided in the liquid flow path and configured to receive the extraction pad;
- a second space provided in the liquid flow path and configured to receive the additive holder; and
- positioning means comprising an extraction pad holder and being configured to position the extraction pad and the additive holder relative to each other such that there is an intermediate space between the extraction pad and the additive holder and such that deformation of one of the extraction pad and the additive holder does not cause a deformation of the other of the extraction pad and the additive holder, the extraction pad holder comprising a bottom configured to support the extraction pad and having at least one through flow opening through which liquid is permitted to flow;

means for feeding hot water under pressure to the inflow opening of the collecting container; and at least one nozzle;

wherein the container receiving unit and the assembly are configured such that the hot water under pressure fed to the inflow opening passes through the extraction pad and extracts at least some of the product to be extracted to form an extract, the extract passes through the additive holder and dissolves the soluble substance, and the at least one nozzle receives the extract and soluble substance from the at least one through flow opening and provides a jet of the extract and soluble substance directed toward the impact surface.

19. An apparatus according to claim 18, wherein the additive holder is present downstream of the extraction pad in the liquid flow path.

20. An apparatus according to claim 18, wherein the collecting container is provided with a bottom and a sidewall while the at least one outflow opening is provided in the bottom.

21. An apparatus according to claim 18, wherein in the bottom a plurality of through-flow openings are provided.

22. An apparatus according to claim 18, wherein at least a part of the extraction pad holder can be moved relative to the rest of the collecting container for placing the additive holder in the collecting container.

23. An apparatus according to claim 18, wherein the positioning means are further provided with a bottom of the collecting container on which the additive holder rests while the extraction pad holder is present in the collecting container at a distance above the bottom of the collecting container.

24. An apparatus according to claim 18, wherein the assembly is further provided with a separating body provided with at least one passage opening, while the separating body is included between the extraction pad and the additive holder while, in use, the extract is fed from the extraction pad via the at least one passage to the additive holder.

25. An apparatus according to claim 18, wherein the separating body is provided between the extraction pad holder and the additive holder.

26. An apparatus according to claim 24, wherein the separating body is provided with a separating plate provided with a plurality of passages so that, in use, the extract is fed via the passages to the additive holder at various positions of the additive holder.

27. An apparatus according to claim 18, wherein the additive holder is provided with an additive pad filled with the soluble substance.

28. An apparatus according to claim 27, wherein the additive pad is provided with a covering manufactured, at least partly, from filtering paper.

29. An apparatus according to claim 18, wherein the additive holder is provided with a cup filled with the soluble substance.

30. An apparatus according to claim 29, wherein the cup is manufactured from a material which bursts open, at least partly, when the extract is supplied.

31. An apparatus according to claim 18, wherein the extraction pad is provided with a covering manufactured, at least partly, from filtering paper.

* * * * *